United States Patent [19]
Neri

[11] 4,031,914
[45] June 28, 1977

[54] SINK TRAP WITH CLEAN OUT OPENING

[76] Inventor: John E. Neri, 4776 Lawndale Road, Syracuse, N.Y. 13215

[22] Filed: Dec. 31, 1975

[21] Appl. No.: 645,521

[52] U.S. Cl. .................... 137/247.51; 220/298; D23/46; 220/301
[51] Int. Cl.² ..................................... F16K 9/00
[58] Field of Search .............. 137/247.49, 247.51, 137/247.41, 247.47; 220/298, 301; D23/40, 43, 46

[56] References Cited
UNITED STATES PATENTS

| | | | |
|---|---|---|---|
| 262,549 | 8/1882 | Worthen | 137/247.51 |
| 712,759 | 11/1902 | Breen | 137/247.51 X |
| 1,217,763 | 2/1917 | Hirrich | 137/247.41 X |
| 3,168,104 | 2/1965 | Mathis | 137/247.51 |
| 3,173,442 | 3/1965 | McKillip | 220/301 X |
| 3,784,047 | 1/1974 | Cooper | 220/301 |
| D56,439 | 10/1920 | Klemme | D23/40 |

*Primary Examiner*—Harold W. Weakley
*Attorney, Agent, or Firm*—Bruns & Jenney

[57] ABSTRACT

A sink trap having a novel clean out arrangement. The clean out arrangement comprises an upwardly extending branch that projects obliquely from the long vertical leg of the J-bend portion of a sink trap. The clean out branch has a relatively large diameter, being of substantially the same diameter as the J-bend itself. At its upper end the clean out branch has an easily removable, sealing closure. With the arrangement provided, the clean out opening is in a readily accessible location and the closure can be removed without tools to permit the trap to be cleaned.

1 Claim, 3 Drawing Figures

U.S. Patent        June 28, 1977        4,031,914
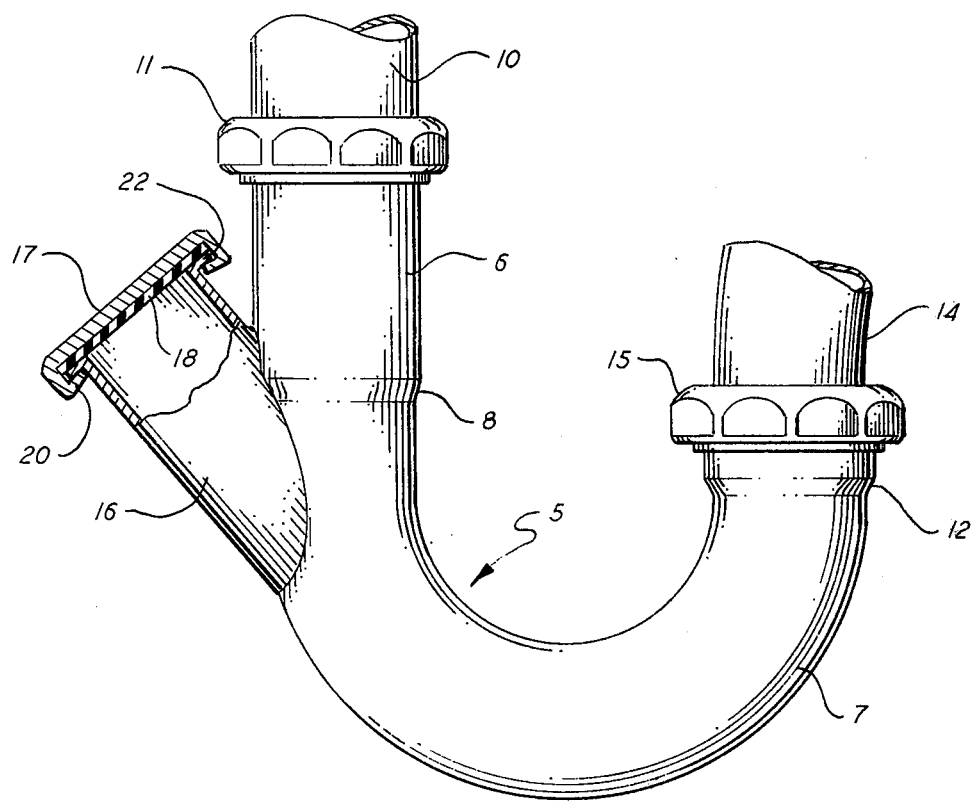
FIG. 1
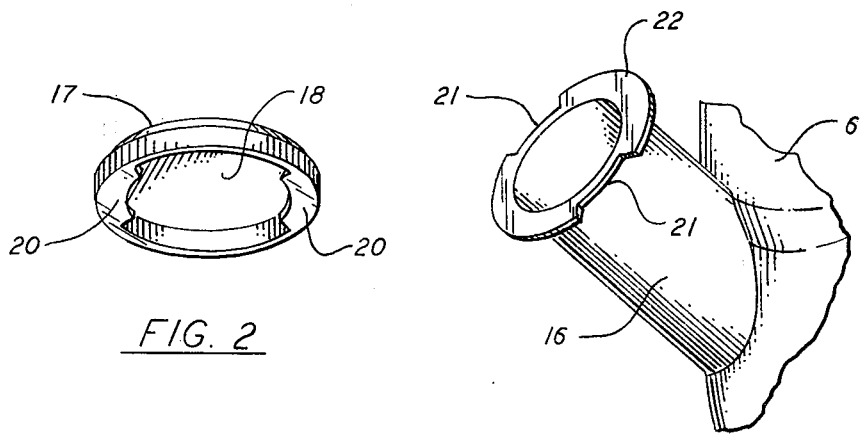
FIG. 2
FIG. 3

SINK TRAP WITH CLEAN OUT OPENING

BACKGROUND OF THE INVENTION

This invention relates generally to plumbing traps, and has particular reference to a novel clean out arrangement for a sink trap.

Plumbing traps having access openings for clean out purposes have been known for many years. In most instances, the access openings are relatively small and are threaded to receive an externally threaded plug that normally closes the opening. This construction has the disadvantage that a wrench is required to remove the plug and the homeowner may not have a wrench of the proper type. Also, if after removing the plug a plumber's snake is passed through the opening to clear out a clogged portion of trap, the snake will after a relatively few applications severely damage the threads in the opening requiring the installation of a new trap.

Another disadvantage of the trap access openings of the prior art is that they are frequently located at the lowest point on the trap. This means that there may be considerable spillage when the plug is removed, and just before removal liquid in the trap may spurt out in many different directions. U.S. Pat. No. 598,992 granted Feb. 15, 1898 to Hosford and U.S. Pat. No. 3,470,900 granted Oct. 7, 1969 to Rothauser disclose threaded access openings located at or close to the lowest point on the trap. U.S. Pat. No. 3,168,104 granted Feb. 2, 1965 to Mathis discloses a threaded access opening located at an upper bend of a trap. These three patents are the closest prior art known to the applicant.

SUMMARY OF THE INVENTION

In the present invention, the clean out arrangement is incorporated in the J-bend portion or component of a sink trap. The tubular J-bend has a vertical leg portion which terminates at its lower end in an arcuate portion and the clean out arrangement includes a tubular branch member that extends upwardly from the vertical leg at an oblique angle thereto. The cross-sectional area of the branch member is preferably the same as that of the J-bend and the member has an open upper end.

The upper end of the branch member is normally closed by a manually removable twist-off sealing cap similar to the closure cap for an automobile radiator. The branch member cap can be removed by anyone without the use of tools and the relatively large opening that is exposed has no threads that can be damaged by a snake or other instrument. Moreover, since the branch opening faces upwardly and is at a relatively high location, spillage is minimized and the spurting of liquids is virtually eliminated.

BRIEF DESCRIPTION OF THE DRAWINGS

FIG. 1 is a side elevation of a sink trap J-bend having clean out means embodying the invention;

FIG. 2 is a perspective view of the closure cap for the clean out means; and

FIG. 3 is a perspective view of the branch member of the clean out means.

DESCRIPTION OF THE PREFERRED EMBODIMENT

Having reference now to the drawings, 5 generally indicates a J-bend for a sink trap, the J-bend having a substantially conventional configuration. Thus, the J-bend, which is tubular, has a vertical leg portion 6 that merges at its lower end into an arcuate portion 7.

The vertical leg 6 is flared as at 8 to receive with a close sliding fit the depending tailpiece 10 of a sink, not shown, A conventional annular nut 11 and washer (now shown) complete the slip-joint connection. The free end of the J-bend arcuate portion 7 is flared as at 12 to receive with a close sliding fit the end of a drain pipe 14. This slip joint also includes a nut 15 and interior washer. The drain pipe may extend horizontally into a wall (P-type trap) or vertically into the floor (S-type trap).

In accord with the invention, the J-bend 5 is provided with clean out means including a tubular branch member 16 that projects from the vertical leg 6 at an oblique angle thereto. The branch member is connected to and communicates with the vertical leg adjacent it lower end and extends upwardly to a point just below the upper end of the leg as shown. The diameter of the branch member 16 is substantially the same as the diameter of the unflared part of the J-bend 5.

Branch member 16 has an open upper end and this opening is normally closed by a manually removable sealing cap 17 that is very similar to an automobile radiator cap. Inside the cap 17 there is a resilient sealing disc 18, and at its lower edge cap is provided with a pair of diametrically opposed lugs 20. These lugs pass through notches 21 in an external flange 22 at the upper end of the branch member when the cap is engaged with the member. Thereafter, rotating or twisting the cap in either direction causes the lugs to engage the underside of flange 22 and cams the resilient disc 18 into sealing engagement with the upper side of the flange. This prevents the escape of liquids or gases from the trap clean out.

The cap 17 can be very easily removed by simply twisting it in either direction to bring the lugs 20 into alignment with the notches 21 and then lifting it off. No tools of any kind are needed, and there are no threads that can be damaged by a snake or other instrument. Since the opening at the upper end of the branch member 16 is as large as the cross section of the member, an elongated cylindrical brush, such as a large test brush, can be used to clean the trap and normally will do so more effectively and with less bother than a plumber's snake. The angle of the branch member with respect to the vertical leg 6 of the J-bend makes it easy to direct a brush into the bottom of the J-bend where clogging is most likely to occur.

The branch member 16 will normally face the front of the sink and thus plus the elevated location of is cap 17 makes the cap very accessible for removal. The location of the branch member opening also means that the only spillage would be liquid caught in the trap between the sink drain and upper end of the branch member.

From the foregoing description, it will be apparent that the invention provides a novel sink trap clean out means having a number of advantageous features. As will be understood by those familiar with the art, the invention may be embodied in other specific forms without departing from the spirit or essential characteristics thereof.

I claim:

1. In a one piece sink trap, a tubular J-bend having a vertical leg portion terminating at its lower end in an arcuate portion, the arcuate portion bending through substantially 180° from its junction with the leg portion and terminating in an upwardly facing open end, the cross-sectional area of the J-bend being substantially constant from one end to the other, clean out means for the sink trap comprising a unitary tubular branch member that is integrally connected to and communicates with the leg portion of the J-bend adjacent its junction with the arcuate portion, the cross-sectional area of the branch member being substantially the same as that of the J-bend, the branch member extending obliquely upwardly and outwardly from its connection with the J-bend and having an upwardly facing open upper end, the opening at the upper end of the branch member being as large as the cross section of the remainder of the member, a manually removable non-threaded twist-off cap normally forming a closure for the upper end of the branch member, the upper end of the branch member being formed with an outwardly projecting flange having notches therein, the cap having inwardly projecting lugs at its lower edge dimensioned so as to pass through the flange notches whereby twisting the cap brings no lugs into securing engagement with the underside of the branch member flange, and means on the cap that coacts with the branch member upper end to seal the connection therebetween.

* * * * *

UNITED STATES PATENT AND TRADEMARK OFFICE
CERTIFICATE OF CORRECTION

PATENT NO. : 4,031,914
DATED : June 28, 1977
INVENTOR(S) : JOHN E. NERI

It is certified that error appears in the above-identified patent and that said Letters Patent are hereby corrected as shown below:

Col. 2, line 52, "thus" should be -- this --; and in the Cl.,Col. 4, line 9, "no lugs" should be -- the lugs --.

Signed and Sealed this

Fourth Day of October 1977

[SEAL]

Attest:

RUTH C. MASON
Attesting Officer

LUTRELLE F. PARKER
Acting Commissioner of Patents and Trademarks